United States Patent [19]

Bunker

[11] Patent Number: 5,730,524
[45] Date of Patent: Mar. 24, 1998

[54] DUAL CONTAINER COMPOSTING DEVICE WITH MIXING STRUCTURE

[76] Inventor: John R. Bunker, 419 Lincoln, Lawrence, Kans. 66044

[21] Appl. No.: 662,166

[22] Filed: Jun. 12, 1996

[51] Int. Cl.⁶ ..................................................... B01F 13/00
[52] U.S. Cl. ........................ 366/130; 220/4.26; 220/4.27
[58] Field of Search ................................. 366/14, 15, 45, 366/53, 54, 56, 57, 58, 130, 219, 220, 225–229, 235, 347, 349; 220/4.24, 4.26, 4.27, 4.33, 908

[56] References Cited

U.S. PATENT DOCUMENTS

| | | | |
|---|---|---|---|
| 630,009 | 8/1899 | Smalley | 220/4.24 X |
| 1,758,303 | 5/1930 | Wild | 220/4.26 X |
| 1,967,469 | 7/1934 | Dulany | 220/4.26 X |
| 2,782,913 | 2/1957 | Devick | 220/4.26 X |
| 5,052,570 | 10/1991 | Johansen | 220/4.33 |
| 5,339,974 | 8/1994 | Raghunathan | 220/4.26 |
| 5,487,604 | 1/1996 | Moran | 366/225 |
| 5,494,350 | 2/1996 | Childress | 366/220 X |
| 5,617,679 | 4/1997 | Meyers | 220/4.26 X |

*Primary Examiner*—Charles E. Cooley
*Attorney, Agent, or Firm*—Lowe, Price, LeBlanc & Becker

[57] ABSTRACT

A coupling device is configured for interconnecting openings of first and second containers, such as commonly available trash containers, to form a composting device. The coupling device is formed of two conveniently packaged tapered coupling portions, having narrow ends which engage each other at a location intermediate between the openings of the containers to form a throat constriction therebetween, as well as for causing mixing of material passing between the two containers. Additionally, there is provided a mixing lip, preferably at the narrow end of each tapered portion, for inducing more pronounced mixing of the material and for enhancing the composting process. Locking bars are provided for coupling the two portions of the coupling device to each other and to the containers. Each locking bar includes clamping shoulders on one surface thereof, for clamping the two portions into a unitary coupling device by engaging surfaces thereof, as well as protruding edges on the opposing surface, for similarly engaging similar surfaces of the containers or for engaging handles of the containers, in order to lock the containers to the coupling device. Advantageously, the protruding edges may be longitudinally displaced along the locking bar from the clamping shoulders, to engage surfaces on the containers which are displaced by distances differing from the displacement of the surfaces of the coupling portions, as well as to permit engagement with displaced container handles.

21 Claims, 3 Drawing Sheets

DUAL CONTAINER COMPOSTING DEVICE WITH MIXING STRUCTURE

FIELD OF THE INVENTION

This invention relates to an apparatus for forming containers for receiving and storing biodegradable waste to develop compost, and specifically to devices which facilitate forming such compost containers from existing, open, consumer articles and which provide an internal structure for the resulting container for stirring the compost to enable rapid composting of yard waste, organic waste and the like.

BACKGROUND OF THE INVENTION

Dealing with waste material produced in ordinary household living has long been a problem, which has been dealt with in a variety of ways.

Composting is a method by which organic wastes are broken down through self sustaining catalytic exothermic reactions, and provides a natural, inexpensive solution to the problem of reducing the amount of collected yard waste, such as grass clippings, leaves, and twigs, as well as of domestic waste, including both organic food waste (animal and vegetable food waste) and inorganic food waste, for transport to landfills. Moreover, composting results in recycling of such materials to provide fertilizer for a yard.

Composting applies more particularly to organic food waste and organic yard waste, and can be implemented very easily on a household by household basis. In order to compost, organic materials (such as food waste and yard trimmings) are simply kept in a pile where the material can remain somewhat moist. It is also possible to add already composted material in order to get the composting process started more quickly. More organic material is added on an ongoing basis and is mixed in with the material already there.

Materials such as fruits, vegetables, egg shells, grains, grass clippings, leaves, and plant remains are all suitable for composting. It is important to use some materials with a high carbon content such as leaves and materials with a high nitrogen content such as kitchen scraps and grass clippings. The organic matter used in the composting process is returned to the soil in a form that is usable by other plants and promotes plant growth. Introduction of properly composted material to soil helps to make the soil rich and organic, and much more suitable for growing plants.

For proper composting it is necessary that the organic material be collected together in a damp, but not overly wet, environment. It is also necessary that a certain amount of air flow past (or through) the mass of organic waste, since oxygen is required for the biological processes and the decomposition. However, the waste material must be heaped together so that the amount of air which reaches the material does not suffice to dry out the material, or to cool it down too much or too quickly. On the other hand, without a sufficient quantity of oxygen, the composting process becomes an anaerobic one, which produces and utilizes a different kind of bacteria, which are malodorous, and does not produce true compost.

In order to expose all the material to the composing process it is also necessary that the material be mixed. Such mixing allows material that may not be composting quickly, or which is not very far along in the composting process, to be mixed with material that is already fairly well composted. That is, proper mixing helps catalyze the less developed composting process. Typically, this is quite helpful in getting material that has been newly introduced into a composting pile to get started more quickly in the composting process. It is an advantage of the process that a large percentage of household waste, estimated at between one third and one half, can be composted. Elimination of such a large percentage of discarded household waste reduces the cost of moving and relocating waste and also reduces the amount of waste in garbage dumps and land fill sites.

Nonetheless, a significant portion of the public still prefers not to use such a process.

The most primitive form of composting, which relies on piling the appropriate waste on the ground and mixing the waste such that proper composting can take place, has several disadvantages, such as failing to protect the compost pile from either animals or the environment, having an unsightly appearance, and the likelihood that, rather than piling up properly as necessary for composting, the waste may instead tend to spread out too much.

Another fairly well known method is to take a length of snow fence and place it such that it forms a circle of about 3 ft. diameter. It is necessary to secure the fence in one or two places by driving stakes into the ground and then tying stakes to parts of the fence, or some sort of similar arrangement. Although this arrangement is fairly inexpensive, allows for proper aeration and allows for access for turning the compost, it requires manual dexterity for construction. Moreover, the structure is not overly sturdy, is not very aesthetically pleasing, and does not absorb very much solar energy, which is useful to keep the composting reaction relatively warm. It is also not very weather-proof, which is necessary for keeping excessive moisture out.

Another popular way to provide a composting apparatus involves making a composting frame out of lengths of wood and then stapling or generally fastening fencing or chicken wire on the inside. The generally accepted ideal size is about one cubic meter or a bit less. Problems similar to those encountered with a snow fence arrangement are also encountered with this arrangement, except that a frame made from wood can be quite sturdy, which requires a higher level of skill to construct.

Also available are prefabricated composters, such as wire composting bins. Such bins are typically made from four wire posts that are embedded into the ground with fencing spanning therebetween. Again, the problems encountered with prefabricated wire composting bins are virtually the same as those encountered with a snow fence composting bin. One advantage with a prefabricated wire composting bin is that it takes very little time to set up or take down. Thus, composting is most easily implemented by using closed composting bins or similar structures. However, even the availability of such composting containers has not resulted in widespread acceptance of composting.

One reason for public apathy to composting is that present compost containers are viewed as producing a rotting mass of wet matter that has an unpleasant odor. Moreover, construction and use of a typical compost container (which may be made of a stationary wooden slat or of the stationary wire mesh frame type), while low in cost, requires manual dexterity and thus deters numerous potential users of the technique from attempting its implementation. Yet another deterrent from widespread public acceptance is found in the appearance of some known containers, which have a plain and unattractive appearance, looking like oil drums, cardboard boxes, or a stack of wooden pallets, none of which is typically found in a home of a potential user so that the shapes thereof are not familiar to the user and are not easily accepted. Moreover, such strangely shaped and unsightly containers are not easily hidden.

Existing stationary composting bins produce an output product that is usually a wet mass of large clumps of semi-decayed matter combined with whole undecayed matter. This wet matter is then inefficiently separated with hand tools to break up the clumps into smaller clumps, thus providing an unappealing prospect for a typical potential user. Existing rotary containers offer a slightly more efficient process in reduction of clump size but are generally lacking in acceptable visual consumer appeal.

For optimal use of microbe enriched catalysts, three major factors—moisture content, oxygen availability, and thermal drain—should all be provided. Most stationary containers ignore the need for oxygen availability and moisture balance, thus resulting in the above mentioned anaerobic reaction. In such containers a desirable aerobic reaction is converted to an undesirable anaerobic reaction. Aerobic reactions are highly desirable since they react up to sixteen times faster than anaerobic reactions. Moreover, the byproducts of aerobic reactions primarily include carbon dioxide, an odorless gas, instead of malodorous methane and ammonia. Inasmuch as existing stationary compost containers complete between thirty-five and seventy-five percent of their compost cycle in an anaerobic reaction, the notoriously bad smell associated therewith provides yet another disincentive to widespread acceptance and use.

Stationary containers particularly do not offer an ability to break up large clumps without opening the container with resulting heat loss. The large clumps are two to five times more dense than surrounding material and consist of up to seventy percent minerals and compounds, and less than fifty percent fiber. The potential quantity of heat energy within a clump is two to five times that of the surrounding material. Thus, if broken up into smaller clumps without losing heat to the container exterior, the clumps can act as heat sources and can distribute heat extensively to the surrounding bacteria colonies. Stationary containers thus have a hot spot, and subsequently have cool, low activity areas within, making composting in the stationary container a less uniform and consequently longer process.

Rotary containers attempt to address this deficiency, but ignore the need for reducing thermal drain. Rotary containers are thus configured to include internal structures for aiding in mixing of the compost when the container is rotated. These structures are complex, and thus expensive to manufactured.

Moreover, because of their large size, prior art containers are not prominently displayed in retail markets, thus further preventing the growth of composting as a widespread waste reduction method. Such stationary containers are marketed in boxes which typically have dimensions of fifteen inches by thirty inches by thirty-two inches, or larger. Further, many rotary containers are made of metal and are of substantial weight, greater than forty pounds for example, which is too heavy for stocking on retail shelves.

Thus, prior art compost containers suffer from a number of deficiencies.

Both the stationary and rotary types of containers are frequently too unsightly to gain public support for expanded use. Stationary types require tedious hand mixing where the operator of the container is thoroughly exposed to the odorous gases within the device. Usually, neither stationary types nor rotary types are portable. Many previous containers have no structures to create air/gas passages or air/gas exchange areas completely to the core of the biomass within, and fail to provide adequate mixing of the compost material, thus operating primarily in the undesirable anaerobic state. Previous containers were not designed for compact lightweight packaging, which is necessary to facilitate stocking of large volumes of the containers on common retail department store shelves.

One type of modern composting bin that overcomes some of the problems associated with the more primitive types of composting bins is a tumbler type of bin. Such a bin includes a plastic barrel that is rotatably mounted on a metal frame. The tumbler has a lid secured on the top and a number of vent holes for aeration. In order to mix the compost, the barrel is simply turned over as desired. Due to the relatively small size of the lid, it is difficult to turn the compost using a pitchfork, compost aerating tool, or the like. Use of such devices to turn the compost provides for much better mixing of the material being composted. However, such a tumbling composter is expensive and does not hold as much compost as most other composting bins.

Another known prefabricated composter is substantially cubic in shape and is made from plastic. The disadvantages of this unit include difficulty in turning and emptying because a door provided at the bottom of the unit for this purpose is small. Additionally, the unit does not hold very much material.

Another known type of composter provides a slightly different approach in that it is dug into a hole in the ground instead of sitting on the ground. A basket is inserted into the hole, compostable waste materials are inserted therein, and a chemical mixture is added to aid the composting process. A top section is then placed over the basket containing the waste material to protect the material from the environment and also to provide heat insulation. The disadvantages of this system include the use of chemicals, the requirement for digging a sizable hole, the relatively small amount of compost that may be processed thereby, and the substantially anaerobic nature of the process, which does not produce proper compost and tends to be malodorous.

Canadian Patent 986,896 to Jerpbak discloses a plastic container to be used for filling large plastic garbage bags. The device, which is formed from a rectangular sheet of material, is then placed into a garbage bag and acts as a distender which holds the garbage bag open so that it may be filled, and is moved upwardly along the garbage bag as the garbage bag becomes filled. The device does not form the entire supporting structure, however, and is not at all contemplated for use without a garbage bag or for composting.

SUMMARY OF THE INVENTION

It is thus a primary object of this invention to provide a device for forming a compost container to accept and decompose waste.

It is a more particular object of the invention to provide a device for forming a compost container from common articles available in a user's home.

It is another object of the present invention to provide a device for combining readily available, rigid structures in order to form a composting bin that is inexpensive, lightweight, easy to assemble and disassemble, weather resistant, aesthetically acceptable, and that will provide a good composting environment.

It is still a more particular object of the invention to provide a device for combining existing trash containers (trash cans) to form a compost container.

Another object is to provide a device for forming a compost container that accommodates and promotes aerobic action in the composting process.

It is yet another object of the invention to provide a device for forming a portable compost container which is easily turned end-over-end and which, when the container is turned, aids in mixing the compost by providing structure for stirring of the compost materials.

Another object of the invention is to provide a device for forming a compost container by combining a pair of trash cans, wherein the device provides a passageway between the combined trash cans to facilitate gas exchange by chemical reaction between the atmosphere and the container interior gas passages.

It is yet another object of this invention to provide a device for easily assembling a pair of trash cans to form a compost container without using tools.

Still another object of the invention is to provide a device for easily assembling a compost container while permitting simple disassembly of the compost container to provide an easy and simple emptying of internal contents thereof.

It is a further object of the invention to provide a device for coupling containers to form a compost container, usable with a single empty container for mixing compost in a plurality of containers each including compost material therein.

Another object of this invention is to provide a compact device of simple construction, easily presented on a store shelf, for constructing a compost container by assembling a pair of readily available open containers.

In accordance with these and other objects of the invention, there is provided an improved composting bin (or compost container) that is proper size for holding an ideal amount of compost—a volume of about one cubic meter, or somewhat less. The compost container formed with the inventive device is made of sturdy plastic, is easy to assemble and disassemble and easy to move, absorbs solar energy fairly readily, and is of a familiar and readily acceptable shape. The resultant composting bin combines two existing trash containers to form a substantially closed structure which protects the compost from foul weather, yet is easily separable to provide a large opening for accessing the compost. The resultant bin is substantially rectangular or cylindrical, in accordance with the shape of the component structures assembled by the inventive device, so that each half of the bin is a substantially continuous piece of material. Thus, the material of the bin constructed by the inventive device is capable of absorbing the stress caused by the weight of the compost, which may reach several hundred pounds, to be absorbed by the material, in the form of hoop stress.

The inventive device is very easy to assemble and install to the trash cans and requires no tools.

Moreover, by providing a separate device for coupling one trash can or the like to another containing compost, the invention permits a single coupled device and a single empty container to be used with any of a plurality of containers, each including compost material therein. The invention thus enables the single empty container to be used to mix the compost in each of a plurality of containers.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

Figure 1:
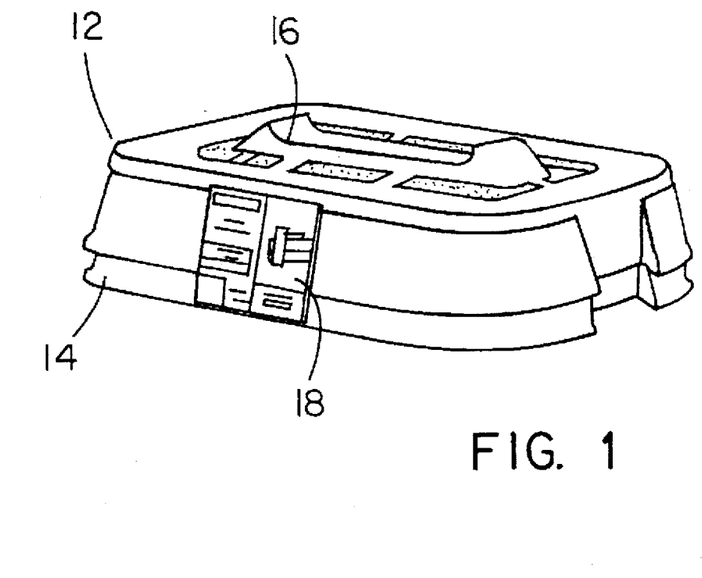
FIG. 1 shows a nested arrangement of the inventive structure.
Figures 6, 7:
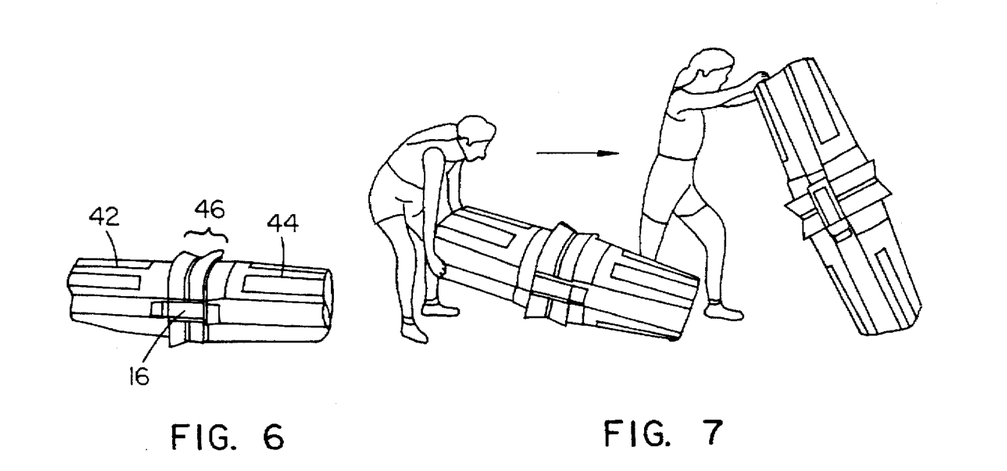
FIG. 6 shows a completed composting device using the coupling apparatus of the invention and a pair of readily available trash containers.
FIG. 7 shows a user tumbling the composting device of FIG. 6.

Referring now to the drawings, FIG. 1 shows a preferred embodiment of the invention. As shown therein, the inventive apparatus may be provided in a convenient package which includes a nested arrangement of first and second substantially identical portions, 12 and 14, each of which is configured for coupling to an existing trash container, as illustrated at FIGS. 6 and 7. Also included in the preferred embodiment (and shown in FIG. 2) are two connector bars 16 and 17, for interconnecting the first and second portions. One connecting bar 16 is illustrated in the nested arrangement of FIG. 1.

As illustrated in FIG. 1, the two portions 12 and 14 have tapered structures, thereby enabling nesting of the two portions one within the other. Such nesting makes it possible to provide the invention in a single compact package, having relatively small dimensions, and requiring little shelf space for display. As may be appreciated from FIG. 1, a commercial packaging of the inventive apparatus may provide an adhesive label 18 for attachment of the portions of invention one to the other. Preferably, the inventive apparatus is formed of a plastic material and may be molded, for example. Thus, connector bar 16 may be molded in one piece with the first portion 12 of the inventive apparatus.

Figure 2:
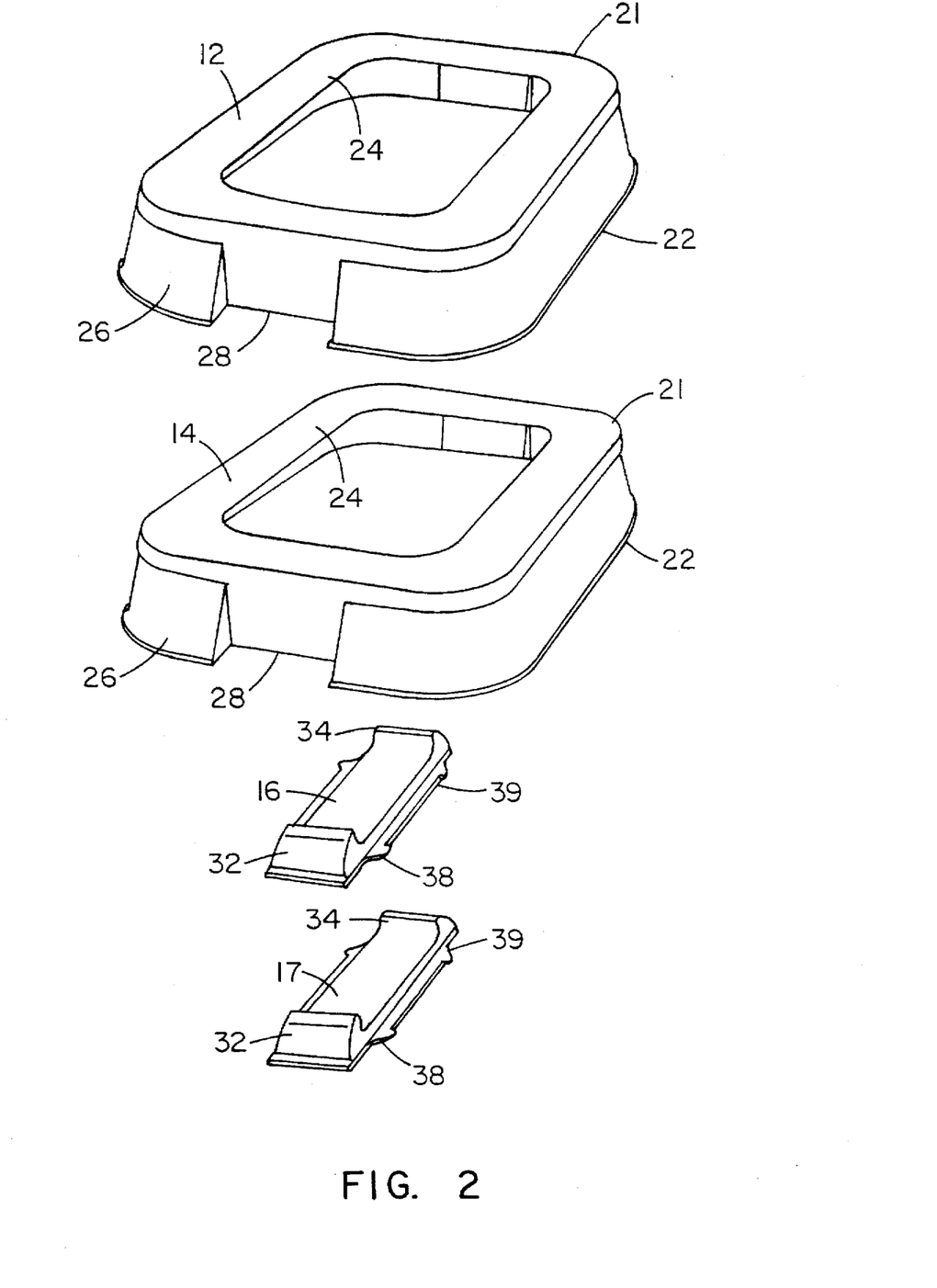
FIG. 2 is an exploded view of the components of the inventive apparatus.

An exploded view of the components of the inventive apparatus is shown in FIG. 2, which shows the first and second portions 12 and 14 separately from one another, as well as showing the two connector bars 16 and 17, separated from the respective portions 12 and 14 formed therewith.

As will be appreciated upon reference to FIG. 2, tapering of the portions 12 and 14 results in a structure having opposing ends 21 and 22 of different cross sectional areas. Thus, for each of the portions 12 and 14 there is provided a smaller cross-sectional area at an end 21 and a larger cross-sectional area at an opposing end 22. As illustrated, the larger end 22 is used to connect each of the portions 12 and 14 to an opening of a respective container (preferably a trash container previously or separately purchased by the user). The two smaller ends 21 of portions 12 and 14 mate with one another in order to couple the two containers and to form a larger closed container. The structure formed by the coupled portions 12, 14 provides a passage between the two containers coupled together to form the larger container. The passage includes a throat, having a narrower cross-sectional area at the interconnection of ends 21 than at the openings of the associated containers coupled to ends 22. An opposite configuration may abe used, in which the smaller ends are used to couple the device to the containers and the larger ends mate with each other. Alternatively, where possible the tapered configuration may be eliminated. In accordance with the invention the closed container, including the passage formed by the inventive structure and the containers coupled thereby, forms a composting device.

The above described passageway formed by the coupled portions of the invention further provides an obstruction for composted material passing from one container to another when the resulting composting device formed thereby is tumbled end over end, and thus provides for an appropriate mixing, or stirring, of the composted material. Towards that end, the inventive structure provides an inwardly projecting mixing lip 24, preferably provided in each of the portions 12 and 14, in order to assure that appropriate mixing will take place.

Although only a single such lip may suffice, and although the mixing lip 24 may be provided anywhere within the portion between the two ends 21 and 22 thereof, for simplicity of manufacture the mixing lip is provided on each portion, thus permitting the invention to be implemented by using two identical components and avoiding the necessity for separate manufacture (or separate molding) of the two components thereof. Moreover, by providing a mixing lip at the small end of each of the two portions, the coupling passageway includes a combined mixing lip having a thickness twice as large as each individual mixing lip, and thus capable of better withstanding impact by the compost material passing through the passage.

For still further resistance to damage from such impacts, the mixing lips 24 of the portions 12 and 14 may include mating elements, such as projecting bayonets or other coupling arrangements, as part of the molded structure thereof. Where such coupling arrangements are symmetrically positioned on the lip surface, it will be appreciated that, upon relative rotation of the portions, the projections and receptacles formed on the two mixing lips will positively engage to couple the two portions and to provide a highly durable arrangement.

It should be appreciated that, because the trash cans can slide quite deeply into the inventive coupling device (depending on requirements imposed by the trash cans), the mixing lips are preferably placed so as to bisect the fully assembled device.

It will also be appreciated that, in order to assure the greatest effectiveness of the mixing lip, the lip 24 preferably projects inwardly from the narrow end 21, rather than from the larger end 22 of each of the two portions 12 and 14. Mixing lip 24 thus provides an obstruction, or impediment to smooth flow of compost from one container to another, when passing through the throat implemented by the inventive structure. Accordingly, the invention provides an inwardly projecting mixing lip to provide compost mixing and aeration.

As is apparent from FIG. 2, portions 12 and 14 of the inventive apparatus include skirts 26. Each skirt includes a gap 28 to accommodate the connecting bars 16 and 17. More particularly, such a gap 28 is provided at opposing sides of each of the portions 12 and 14, though only a single gap is shown for each portion in FIG. 2. The gaps preferably cooperate, or interact, with design features of the trash cans (or other containers) being combined. Thus, it is possible that, while retaining the advantages of the invention, the gaps may be omitted. For the model of the invention illustrated in FIG. 2, intended for use with a particular trash can, the gaps are provided to accommodate handles at the side of the container.

As will be appreciated from the illustration of FIG. 2, and as will be understood from the following description, each of the connector bars 16 and 17 includes on a first surface a pair of projections 32 and 34, for engaging handles of the containers coupled by the inventive apparatus. In addition to the projections 32 and 34, on an opposing surface each of the connector bars is seen to include a separate set of projections 38 and 39 for matingly engaging (and coupling) the portions 12 and 14.

Application of the present invention to common containers and structures available in a user's dwelling, such as trash containers, and use of the resultant structure for composting, will be understood from the following description.

Figure 3:
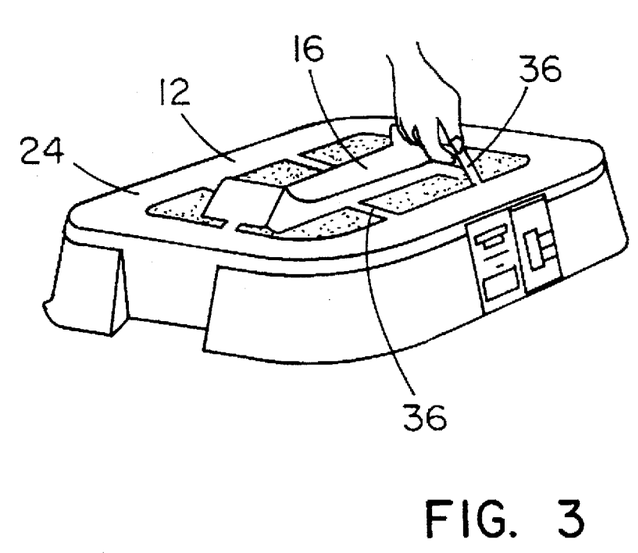
FIG. 3 illustrates a step in forming a coupler using the structure of FIG. 1.

Referring now to FIG. 3, after rupturing the adhesive label 18 in FIG. 1, a user separates the connector bar 16 from the portion 12 formed therewith and connected thereto. Where the connector bar is formed in a single unit by injection molding, or the like, thin connecting plastic strips 36 may be broken by the user, either manually or by the use of scissors, pliers, a screw driver or the like. Where the connector bars are formed separately from the portions of the invention, the connector bars may be adhesively attached or otherwise secured to the inventive portions, or may be separately packaged therewith. Of course, the connector bars may be packaged separately from the two portions forming the inventive apparatus. Indeed, each of the components of the invention may be separately sold, with or without packaging.

Figure 4:
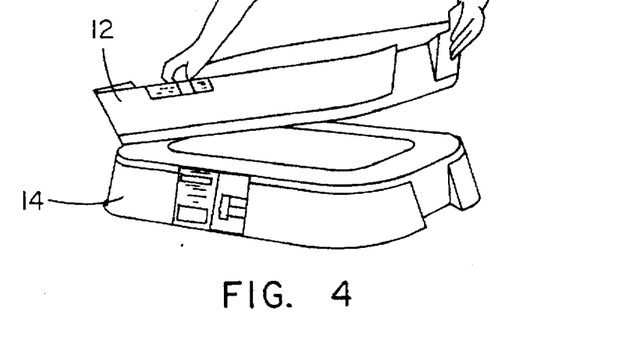
FIG. 4 shows another step in forming the coupler.

Having separated the two portions 12 and 14, the user inverts one of the two portions, as shown in FIG. 4 wherein portion 12 is inverted for matingly engaging portion 14.

Figure 5:
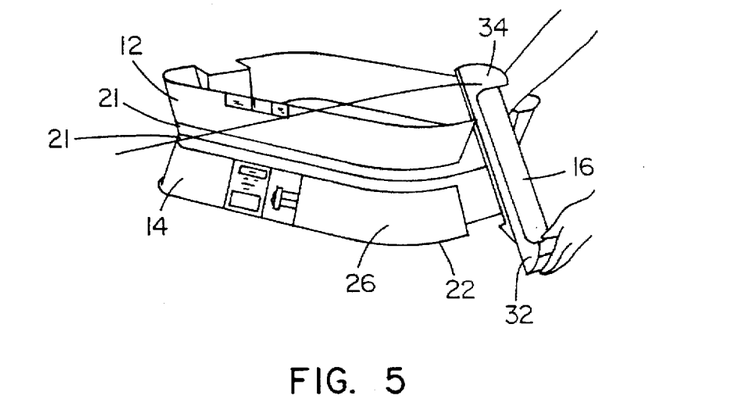
FIG. 5 shows a final step in assembling a coupling apparatus in accordance with the invention, for assembly with a pair of containers.

FIG. 5 illustrates assembly of the components of the inventive apparatus to form the coupling passageway. Specifically, the portions 12 and 14 are matingly connected at the narrow ends 21 thereof. As above noted, the two portions may include engaging structures for matingly engaging one another. Alternatively, holes may be provided for external fastening means to fasten together the two portions. As shown in FIG. 5, however, the connector bars 16–17, alone, may be used to assemble portions 12 and 14 into the inventive structure.

Referring again to FIG. 5, connector bar 16 is illustrated as providing mating engagement between the two portions 12 and 14. It should be appreciated that, in correspondence with the projections 38 and 39, there is preferably provided a set of corresponding projections on the two portions of the inventive structure, for latchingly mating with, or connecting to, the connector bar, thus to provide the mating engagement of the two portions.

When both connector bars 16 and 17 are connected to the opposing gaps 28 in the skirts of the inventive structure, the two portions are stably connected to one another.

The stable configuration of the apparatus is then connected to a pair of containers (such as trash cans) by arranging the larger end 22 of each skirt 26 over the opening of a respective container. For example, where the skirt 26 of portion 14 is first coupled to such a container as is contemplated by the illustration of FIG. 5, projections 32 of the two connector bars 16 and 17 engage the handles of the container. As the inventive apparatus is made of a plastic material, and in view of the plastic construction of most trash cans (or other domestic containers), either the connector bar projection or the handle (or both) flexes sufficiently for the projection 32 to pass through the handle and to latchingly engage therewith. A second empty container, such as a second trash can for example, may then be inverted and mounted on the top of portion 12, for latching engagement for projection 34 of the connector bars. As an alternative, the inventive coupling apparatus, together with a container coupled thereto, may be inverted for connection to an upright container. As another alternative, the coupled passageway and container may be positioned on a horizontal surface, such as the floor, for coupling with a similarly positioned second container, although it should be appreciated that such positioning is not practical when one of the containers has a sufficient amount of compost therein, as the compost would spill out of the container.

Accordingly, in the fully assembled composting device formed from the inventive coupling apparatus and containers, an upper opening of each of the containers is surrounded by a skirt of one of the two portions of the invention, and together therewith abuttingly supports a mixing lip, positioned thereon in a substantially perpendicular orientation to the opening and to the direction of flow through the passageway. It will be appreciated that the entirety of the mixing lip 24 may be supported by a rim of the opening of the trash can.

A completed composting device in accordance with the invention is illustrated in FIG. 6, wherein two trash containers 42 and 44 are shown to be interconnected by a coupling structure 46, which is composed of two portions of the inventive apparatus in mating engagement. As seen in FIG. 6, connector bar 16 is in latching engagement with handles of each of the two containers 42 and 44. It will be appreciated that the completed structure may thus be rolled along its periphery to provide some mixing and aeration of the internal compost material. However, more effective mixing and aeration is provided by the internal mixing lip 24 of the inventive apparatus when a user tips the structure end over end, as appreciated from FIG. 7.

Preferably, the peripheral configuration of the components of the inventive apparatus is shaped similarly to, or identically with, specific configurations of commercially marketed trash containers for straightforward engagement therewith. Thus, there may be provided different models of the inventive apparatus for mating engagement with different models of existing containers and the like. Alternatively, by using a tapered structure, a single model of the inventive apparatus may be provided for mating engagement with any of a series of containers of a range of rim opening dimensions. In either case, however, it is preferable that the gaps 28 and connector bars 16 and 17 be configured in accordance with placement, size and positioning of any handles provided on the containers. Appropriate model sizes and configurations are thus preferably provided for retro-fitting the inventive apparatuses to numerous models and configurations of available containers. Although the preceding description has illustrated substantially rectangular configurations of the invention, which are provided for containers having rectangular openings, it should be readily understood that circular configurations are provided for containers having circular openings, and that other configurations may be provided for containers having openings so configured.

Application of the inventive coupling device for its intended purpose will be understood from the following description.

As is well known, composting materials must be stirred periodically, at periods of no longer than three days, and preferably more often than that. As will be appreciated, the containers (such as trash cans) contemplated as being utilized with the inventive structure are typically cylindrical or rectangular in cross section and are each formed of a single surface. Thus, when combined by the inventive device, there results a composting device which may be turned end-over-end, causing the compost material to pass from one container to the other. Although less likely to produce mixing in a container filled with compost, the cylindrical or rectangular cross section of the device permits the resulting composting device to be easily rolled on its substantially single surface for tumbling the contents thereof to produce an effect similar to stirring.

During such passage, the constricted throat provided by the inventive device, and more particularly the mixing lip provided at the juncture of the two trash cans and between the two trash containers, acts to provide stirring and tumbling of the compost. The mixing lip thus breaks up the large clumps of the compost material to improve heat distribution within the container and to maintain an aerobic reaction therein.

Thus, rolling or turning of the composter, and consequent tumbling and stirring of its contents, may be implemented at any time with very little effort, such as immediately after addition of new materials thereto. The low level of effort required for such turning and rolling contrasts greatly with the shoveling effort required to implement tumbling and stirring in known compost containers, and does not require the use of any hand tools. Particularly, the inventive device forms a compost device which does not require lifting the materials thereof by a shovel, dumping or dropping the materials in order to implement such stirring.

As hereinabove summarized, the composter implemented by the inventive structure is found to be quite sturdy because each half of the outer shell thereof is preferably made from a single piece of plastic material. Moreover, because the outer shell of the composter has a high percentage of solid area, the composting material is sheltered from the environment thereby allowing for proper moisture control. A high percentage of solid area also helps to substantially hide the compost from view.

Because the inventive device is not structured to provide an air-tight connection of the containers combined thereby, it is an advantage of the invention that small openings or cracks for air transfer are provided in the throat area formed between the coupled containers formed thereby. Thus, reaction by-products such as gases, water, and water vapor either gravitate or travel by convection out of the container, through the openings or cracks provided in the container throat. Such a configuration produces a significant aerating action, while protecting the contents from excessive rain moisture, thus developing the desired aerobic action in the composting process. Moreover, in the compacting action which takes place as the particles become composted, or nearly so, some of the particles may fall through the cracks and fertilize the ground. This is significant when the composter is used on a lawn, where bare spots may occur in the vicinity of the composting bin. The same openings or cracks also enable drainage of water, such as that produced in the composting action, and any that may have entered thereinto due to rain.

As the device is capable of, but not intended to, be left on between turning activities, aeration of the compost is mainly due to the compost turning from day to day. Particularly, as the compost moves from one coupled container to a second, so also does the fresh air percolate through from the second container to the first as the air is displaced by the compost. If the device were left in place with the two containers, the air inside would likely become stale and composting would become less effective.

Another advantage of the invention is that, by providing a simple structure for a compost container, the inventive device simplifies the process of rolling or turning over the container. Thus, a compost container formed by the inventive device is more likely to be rolled or turned over frequently to provide the necessary tumbling of the materials therein. In rolling, the contents of the container are redistributed and agitated by action of the lip provided in the connecting throat formed by the inventive device, with the consequence that the aerobic action continues, eliminating or minimizing annoying odors.

A further advantage of the invention is that, since a composter formed with the aid of the invention is so easily rolled and would likely be rolled very often, it does not remain in one location for excessive lengths of time, thus eliminating corresponding deterioration of lawn due to lack of sunlight, as occurs with other types of composters which, generally, are not moved at all.

Addressing another object of the invention, relating to providing motivation for shelf display of devices for promoting composting and for purchasing the same, the device of the present invention may be purchased in a compact state wherein its two halves are nested within each other. Such a device requires little shelf space and permits simple and straightforward access by the consumer. The consumer assembles the device at the composting site, prior to its use. Assembly is a simple process, requiring only a few minutes, in which the wrapper is removed, the nested halves separated, each half is assembled to a respective trash can, and the two trash containers are then interconnected by the mating features of the device halves. Once assembled, the interconnection between the two halves of the inventive device resists radial movement of the two trash cans forming the container, as well as resisting separation thereof, by the interconnection structure provided therein.

The device, once assembled, is intended to remain assembled. Access to the compost is achieved by removing the inventive coupling device from the trash cans combined thereby. Thus, filling, emptying, adding water to, or accessing the materials within the assembled compost container is a simple matter for a compost container formed by the inventive device. In an alternative approach, where the coupling device and trash containers are kept assembled to one another, the two interconnected halves of the inventive device may be separated by unsnapping the components thereof by hand, without requiring the use of any tools.

To implement composting in the assembled container, the container may be rolled, turned, or carted to any location within the user's premises. With the two halves of the inventive device separated from one another, new or added yard waste or other organic waste may be placed in the interior of one of the trash cans, or some of the internal contents of one of the trash cans may be removed. Although the removal may be implemented with the aid of a shovel for an upright trash can, the contents may be removed without tools by simply tipping the trash can.

Gas and water vapor exchange with the environment external to the compost container is achieved during turning. The container acts to contain nearly saturated amounts of water vapor.

The compost container will be turned (or rolled) periodically to effect stirring of its contents with the aid of the mixing (or stirring) lip provided by the inventive device, thus implementing a change in the uniformity of texture, moisture, and reaction heat sources within the contents. Because the container is closed and of cylindrical or rectangular cross section, the user may roll or turn the container daily, thus to distribute the waste material which is closest to the surface of the combined trash cans to other locations within the container. At the same time, waste material that is not near the surface will be brought to a close proximity of the surface, thus eventually exposing all of the materials to the gases and water vapor within the container. Turning the container over similarly stirs the internal contents thereof, interchanging materials closest to the inner surfaces of the container with materials more centrally located therein.

Such stirring also assists in replenishing the reaction by-product gases within the container with reaction fuels such as water vapor and oxygen. The distribution of the advanced degraded waste, which has density of up to three times the density of unreacted waste, within the container introduces heat sources and enzymes to portions of the container contents that may not be degrading as vigorously. This distribution contributes to increasing reaction speed by spreading heat uniformly throughout the container, thereby effecting a reduction in the number and size of undesirable hot spots and cold spots.

Rolling or stirring of the container also conditions the shape of the degraded waste within the container into small sized clumps. Following several days (e.g., twelve) of degrading, the reacted clumps of compost may be emptied or removed from the container, or may continue to be processed with newly added waste.

The modular construction of the container which is provided by the inventive interconnecting device moreover facilitates disassembly of the compost device for storage in the off season and provides an economical manner for composting large quantities of waste at minimal expense. Specifically, with a single coupling device according to the invention and a single (empty) trash can for turning end-over-end with a (compost-filled) trash can, a plurality of trash cans or similar containers may each be turned with the aid of a single coupling device and the empty container, by merely removing the coupling device from one filled container and reconnecting to another.

The foregoing description of the preferred embodiment of the invention has been presented for purposes of illustration and description. It is not intended to be exhaustive or to limit the invention to the precise forms disclosed, since many modifications or variations thereof are possible in light of the above teaching.

For example, while the projections 32 and 34 are on an opposite surface of the locking bar 16 from the projections 38–39, for some container configurations the projections may be on the same surface. Specifically, similarly to engagement of surfaces of portions 12 and 14 by projections 38 and 39, the containers may include surfaces easily engaged, and clamped, by projections 32 and 34 when positioned on the same surface of connector bar 16 as the projections 38–39. For such a configuration the projections 32 and 34 would be displaced from each other by a larger distance than the displacement of projections 38 and 39. On the other hand, when connector bar 16 is used to engage handles of the containers, it is possible that the displacement between projections 32 and 34 may be the same as, or less than, the displacement between projections 38 and 39, particularly in a situation wherein the handles protrude above the rim of the two containers. Further, while the disclosed coupling device has been identified as being provided in components assembled by the user, it is contemplated that the coupling device be sold in a pre-assembled, monolithic, form, or as a one piece coupling device. Many other modifications are possible without departing from the spirit and scope of the invention.

Accordingly, all such modifications and variations are within the scope of the invention and covered by the scope of the appended claims. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

I claim:

1. Composting apparatus including first and second containers and a coupling device for coupling said first and second containers;

said coupling device comprising:
   first and second portions;
   said first and second portions each having a first end for engaging an opening of a respective one of the first and second containers and a second end for engaging the other of said first and second portions to form a throat between the first and second containers,
   wherein at least one of said first and second portions is tapered from a first circumference at said first end thereof to a second circumference, smaller than said first circumference, at said second end thereof; and
   means for mixing compost material passing through said throat between the first and second containers.

2. Composting apparatus in accordance with claim 1, wherein said first and second portions are substantially identical.

3. Composting apparatus in accordance with claim 1, wherein said mixing means comprises a throat structure having a passage between said second ends of said first and second portions narrower than a passage through said first end of at least one of said first and second portions at the respective container engaged thereby.

4. Composting apparatus in accordance with claim 3, wherein said mixing means further comprises a lip structure connected to at least a particular one of said first and second portions, protruding inwardly into said throat for partially blocking passage of composting material between the first and second containers and for causing tumbling and mixing thereof during passage.

5. Composting apparatus in accordance with claim 4, wherein said lip structure is provided at said second end of said particular one of said first and second portions.

6. Composting apparatus in accordance with claim 4, wherein at least one of said first and second portions is tapered from a first circumference at said first end thereof to a second circumference, smaller than said first circumference, at said second end thereof.

7. Composting apparatus in accordance with claim 6, wherein said first and second portions are tapered portions, each portion having said second end thereof narrower than said first end thereof, and each portion having a lip portion protruding therefrom into said throat to form said lip structure.

8. Composting apparatus in accordance with claim 7, further comprising locking means for lockingly engaging said coupling device to the first and second containers.

9. Composting apparatus in accordance with claim 8, wherein each of the first and second containers includes a handle, and said locking means comprises a structure engaging at least one of said first and second portions and further engaging at least one handle of the first and second containers.

10. Composting apparatus in accordance with claim 9, wherein said first and second portions are substantially identical.

11. Composting apparatus in accordance with claim 9, wherein:
    said engaging structure of said locking means comprises a first structure for clampingly engaging said first and second portions and a second structure latchingly engaging a handle of each of the first and second containers;
    said locking means has first and second opposing surfaces;
    said first structure of said locking means comprises first and second shoulder portions on said first surface thereof for abutting against first and second surfaces of said first and second portions, respectively, thereby clamping together said first and second portions; and
    said second structure of said locking means comprises first and second protrusions on said second surface thereof for protruding through and engaging the handles of each of the first and second containers, thereby forming a substantially closed composting apparatus therefrom.

12. Apparatus for coupling first and second containers to form a composting device, comprising:
    first and second portions;
    said first and second portions each having a first end for engaging an opening of a respective one of the first and second containers and a second end for engaging the other of said first and second portions to form a throat between the first and second containers,
    wherein at least one of said first and second portions is tapered from a first circumference at said first end thereof to a second circumference, smaller than said first circumference, at said second end thereof; and
    means for mixing compost material passing through said throat between the first and second containers.

13. Coupling apparatus in accordance with claim 12, wherein said mixing means comprises a passage in said throat between said second ends of said first and second portions which is narrower than a passage through said first end of at least one of said first and second portions at the container respectively engaged thereby.

14. Coupling apparatus in accordance with claim 12, wherein said first and second portions are substantially identical.

15. Coupling apparatus in accordance with claim 12, wherein said mixing means comprises a lip structure connected to at least one of said first and second portions, protruding inwardly into said throat and partially blocking passage of composting material between the first and second containers for causing tumbling and mixing thereof.

16. Coupling apparatus in accordance with claim 15, wherein said first and second portions are tapered portions, each portion having said second end thereof narrower than said first end thereof, and each portion having a lip portion protruding therefrom into said throat to form said lip structure.

17. Coupling apparatus in accordance with claim 16, further comprising locking means for lockingly engaging said coupling apparatus to the first and second containers, wherein each of the first and second containers includes a handle, and said locking means comprises a first structure for clampingly engaging said first and second portions and a second structure latchingly engaging at least one handle of the first and second containers.

18. Coupling apparatus in accordance with claim 17, wherein said locking means has first and second opposing surfaces, and said first structure of said locking means comprises first and second shoulder portions on said first surface thereof for abutting against first and second surfaces of said first and second portions, respectively, thereby clamping together said first and second portions;

said second structure of said locking means comprises first and second protrusions on said second surface thereof for protruding through and engaging the handles of the first and second containers, thereby forming a substantially closed composting apparatus therefrom.

19. Composting apparatus including first and second containers and a coupling device for coupling said first and second containers;

said coupling device comprising:
  first and second portions;
  said first and second portions each having a first end for engaging an opening of a respective one of the first and second containers and a second end for engaging the other of said first and second portions to form a throat between the first and second containers;
  means for mixing compost material passing through said throat between the first and second containers; and
  locking means for lockingly engaging said coupling device to the first and second containers;
wherein each of the first and second containers includes a handle, and said locking means comprises a structure engaging at least one of said first and second portions and further engaging at least one handle of the first and second containers.

20. Apparatus for coupling first and second containers to form a composting device, comprising:
  first and second portions;
  said first and second portions each having a first end for engaging an opening of a respective one of the first and second containers and a second end for engaging the other of said first and second portions to form a throat between the first and second containers;
  means for mixing compost material passing through said throat between the first and second containers; and
  locking means for lockingly engaging said coupling apparatus to the first and second containers, wherein each of the first and second containers includes a handle, and said locking means comprises a first structure for clampingly engaging said first and second portions and a second structure latchingly engaging at least one handle of the first and second containers.

21. Apparatus for coupling first and second containers to form a composting device, comprising:
  apparatus forming a throat between the first and second containers;
  means for mixing compost material passing through said throat between the first and second containers; and
  locking means for lockingly engaging said coupling apparatus to the first and second containers,
  wherein each of the first and second containers includes a handle, and
  said locking means comprises a first structure for clampingly engaging said first and second portions and a second structure latchingly engaging at least one handle of the first and second containers.

* * * * *